(12) United States Patent
Sobieski et al.

(10) Patent No.: US 7,029,759 B2
(45) Date of Patent: Apr. 18, 2006

(54) HALOGEN-CONTAINING VINYL POLYMER COMPOSITIONS

(75) Inventors: Robert T. Sobieski, Charlotte, NC (US); Daniel C. Gottschalk, Columbus, MS (US)

(73) Assignee: OMNOVA Solutions Inc., Fairlawn, OH (US)

( * ) Notice: Subject to any disclaimer, the term of this patent is extended or adjusted under 35 U.S.C. 154(b) by 172 days.

(21) Appl. No.: 10/262,547

(22) Filed: Sep. 30, 2002

(65) Prior Publication Data

US 2004/0063822 A1   Apr. 1, 2004

(51) Int. Cl.
   *B32B 27/30*   (2006.01)
(52) U.S. Cl. .................. 428/522; 524/151; 524/153; 524/385; 524/569
(58) Field of Classification Search ................ 524/385, 524/569, 146–153; 428/522
   See application file for complete search history.

(56) References Cited

U.S. PATENT DOCUMENTS

| | | | |
|---|---|---|---|
| 3,076,775 A | 2/1963 | Masterson et al. ......... 260/31.8 |
| 3,414,535 A | 12/1968 | Barnes et al. ............. 260/31.8 |
| 3,641,218 A | 2/1972 | Friedman et al. .......... 260/928 |
| 3,674,730 A * | 7/1972 | King ........................ 524/317 |
| 3,725,515 A | 4/1973 | Schimmelschmidt et al. .......................... 260/978 |
| 3,819,571 A | 6/1974 | Guttag .................. 260/45.8 R |
| 3,928,275 A * | 12/1975 | Hiyama et al. ............. 524/301 |
| 3,969,469 A | 7/1976 | Love ........................ 260/891 |
| 4,059,562 A * | 11/1977 | Hoch et al. ................. 524/145 |
| 4,064,100 A | 12/1977 | Hechenbleikner ...... 260/45.8 R |
| 4,083,860 A | 4/1978 | Ruf ........................ 260/429.7 |
| 4,116,926 A | 9/1978 | York ...................... 260/45.7 P |
| 4,751,261 A | 6/1988 | Miyata et al. ............... 524/181 |
| 4,960,843 A * | 10/1990 | Yazawa et al. ............. 526/262 |
| 5,332,772 A | 7/1994 | Beekman et al. ........... 524/301 |
| 5,364,895 A | 11/1994 | Stevenson et al. .......... 524/120 |
| 5,369,208 A | 11/1994 | Stuber et al. ................. 528/53 |
| 5,422,388 A | 6/1995 | Patel et al. .................. 524/120 |
| 5,438,086 A | 8/1995 | Stevenson et al. ........... 524/120 |
| 5,444,111 A | 8/1995 | Beekman et al. ........... 524/180 |
| 5,532,303 A | 7/1996 | Beekman et al. ........... 524/180 |
| 5,575,951 A | 11/1996 | Anderson ................ 252/400.1 |
| 5,672,646 A | 9/1997 | Allas et al. .................. 524/357 |
| 5,817,708 A | 10/1998 | Congelio et al. ........... 524/104 |
| 5,821,289 A | 10/1998 | Congelio et al. ........... 524/104 |
| 5,859,103 A | 1/1999 | Congelio et al. ........... 520/124 |
| 5,958,254 A | 9/1999 | Rooney ..................... 210/757 |
| 5,962,560 A | 10/1999 | Congelio et al. ........... 524/104 |
| 5,985,959 A | 11/1999 | Harvey et al. ................ 524/84 |
| 6,216,693 B1 * | 4/2001 | Rekow et al. ......... 128/205.27 |
| 6,224,791 B1 | 5/2001 | Stevenson et al. .......... 252/589 |
| 6,232,380 B1 | 5/2001 | Conroy et al. .............. 524/291 |
| 6,258,880 B1 | 7/2001 | Conroy et al. .............. 524/180 |
| 6,313,203 B1 | 11/2001 | Van Haveren et al. ......... 524/58 |
| 6,326,518 B1 | 12/2001 | Duvall et al. .................. 568/46 |
| 6,362,260 B1 | 3/2002 | Stevenson et al. .......... 524/115 |
| 6,372,821 B1 | 4/2002 | Patel et al. .................. 523/219 |
| 6,545,071 B1 | 4/2003 | Gugumus .................... 524/100 |
| 2001/0023270 A1 | 9/2001 | Stein et al. .................. 524/128 |
| 2001/0036987 A1 | 11/2001 | Beekman et al. ........... 524/301 |
| 2002/0035179 A1 | 3/2002 | Herzig et al. ............... 524/179 |
| 2002/0040081 A1 | 4/2002 | Stein et al. .................. 524/121 |
| 2002/0103277 A1 | 8/2002 | Duvall ....................... 524/110 |
| 2003/0001136 A1 | 1/2003 | Stevenson et al. ......... 252/299.1 |
| 2004/0061095 A1 | 4/2004 | Sobieski et al. ........ 252/400.24 |
| 2004/0063822 A1 | 4/2004 | Sobieski et al. ............ 524/115 |

FOREIGN PATENT DOCUMENTS

| | | |
|---|---|---|
| EP | 0182526 B1 | 10/1985 |
| EP | 0623648 A1 | 1/1994 |
| EP | 0623649 A2 | 1/1994 |
| EP | 0742259 B1 | 5/1996 |
| EP | 0890608 A2 | 7/1998 |
| EP | 0945484 A1 | 3/1999 |
| EP | 0945485 A1 | 3/1999 |
| EP | 0987295 A1 | 9/1999 |
| EP | 0994148 A1 | 10/1999 |
| EP | 1004624 A1 | 11/1999 |
| EP | 1004625 A1 | 11/1999 |
| JP | 53016064 | 2/1979 |
| JP | 61047740 | 3/1986 |
| JP | 62232401 | 10/1987 |
| JP | 63057656 | 3/1988 |
| JP | 01260071 | 4/1988 |
| JP | 02274748 | 11/1990 |

(Continued)

OTHER PUBLICATIONS

3 PGS, Jun., 2002, "PVC heat stabilizers offer reduced emissions. (Additives)", Modern Plastics, vol.: 79, Iss. 6, p. 82 (1), Issn: 0026-8275, OM Group Inc. (ChemWeb.com).

4 PGS, Jul. 2002, "Heat stabilizers target specific PVC applications. (Additives" Modern Plastics, vol.: 79, Iss. 7, p. 67 (2), Issn: 0026-8275, Akcros Chemicals America (ChemWeb.com).

(Continued)

*Primary Examiner*—Peter Szekely
(74) *Attorney, Agent, or Firm*—Kagan Binder, PLLC (57) ABSTRACT

The invention provides a film that includes chloride-containing vinyl polymer and a stabilizer component, wherein the film has a 96-hour Volatile Organic Compound Emission Factor of no more than 1,000 μg/m²/hour. The invention also provides a film that includes vinyl chloride polymer and a stabilizer component comprising a stabilizer and a diluent, wherein the diluent comprises a monohydric alcohol having 12 or more carbon atoms. Also described are methods of stabilizing a chloride-containing vinyl polymer film, a system for providing a low VOC releasing chloride containing vinyl polymer film, and methods of printing a chloride-containing vinyl polymer film.

15 Claims, 2 Drawing Sheets

FOREIGN PATENT DOCUMENTS

| | | | |
|---|---|---|---|
| JP | 5140398 | | 6/1993 |
| JP | 10036811 | | 11/1996 |
| JP | 09111079 | | 4/1997 |
| RU | 1453125 | * | 7/1970 |
| RU | 362033 | | 12/1972 |
| WO | WO00/50494 | | 8/2000 |

OTHER PUBLICATIONS

33 PGS, © 1993, "Nonlead Stabilizers", Handbook of Polyvinyl Chloride Formulating, P. Baker and R.F. Grossman, Synthetic Products Company.

PG 134-142, Jun. 1996, "Studies of Possible Chemical Emissions from PVC Articles Used in Indoor Applications and the Effect on Indoor Air Quality", Christopher J. Howick and Sally A. McCarthy, Journal of Vinyl & Additive Technology, vol. 2, No. 2.

4 PGS, Dec. 20, 2000, Chemical Fabrics & Film Association, Inc., Bulletin No. CFFA 201-00, Subject: "Process Emissions".

3 PGS, Dec. 1, 1999, Chemical Fabrics & Film Association, Inc., Minutes of Meeting on Oct. 25, 1999, Subject: "Meeting of Stabilizer Manufacturers".

3 PGS, Sep. 6, 1999, Summary of Sep. 3, 1999 conference call, CFFA Meeting Summary.

3 PGS, Mar. 23, 1999, Chemical Fabrics & Film Association, Inc., Minutes of Meeting.

2 PGS, Mar. 26, 1999, Summary of Mar. 23, 1999 CFFA Meeting Agenda.

4 PGS, Dover Phosbooster, Advanced Phosphite Ester Technology product brochure, Dover Chemical Corporation, Dover, Ohio.

20 PGS, High Performance Additives product brochure, Dover Chemical Corporation, Dover, OH.

* cited by examiner

HALOGEN-CONTAINING VINYL POLYMER COMPOSITIONS

FIELD OF THE INVENTION

This invention relates to halogen-containing vinyl polymer compositions, such as vinyl chloride polymer films, having reduced volatile organic compound emissions. In particular, this invention relates to a stabilizer component for halogen-containing vinyl polymer compositions, and methods of making those compositions.

BACKGROUND OF THE INVENTION

People spend a significant amount of time indoors, which has caused more concern about the quality of the air we breathe while inside buildings. Products and materials in homes and office buildings emit pollutants and chemicals, many of which are considered unhealthy or even carcinogenic. Recent studies by the U.S. Environmental Protection Agency and other health agencies have shown that indoor air pollutants are typically two to five times (sometimes 10 to 100 times) higher than levels found in outside air. One class of pollutants that has drawn particular attention is volatile organic compounds (VOCs). These compounds are ubiquitous, and much attention has been given to identifying the source of VOCs and reducing their emissions.

Generally, VOCs are volatile compounds that contain the element carbon, but in some applicable regulations, the definition of VOCs excludes one or more of methane, carbon monoxide, carbon dioxide, carbonic acid, metallic carbides and carbonates, ammonium carbonate, and exempt compounds, such as methylene chloride and 1,1,1-trichlorethane. One known source of VOCs is products manufactured of polyvinyl chloride (PVC). It is known that PVC and other halogenated polymers are subject to deterioration or degradation when exposed to heat and light. Two major types of PVC degradation are hydrogen chloride (HCl) degradation and oxidation. PVC generates HCl due to heat or short-waved light such as ultraviolet waves, X-ray, or γ-ray, resulting in double bonds within molecules. Oxygen in the air will cause oxidation reactions, resulting in chain scission or cross-linking. Such degradation results in generation of HCl, as well as such physical changes as darkening or other color change of the PVC polymer and the loss of tensile, flexural, and impact strengths. PVC degradation can occur during processing, as well as post-production (for example, once the PVC product has been installed in an office or home environment).

When PVC is processed at high temperatures, it is degraded by dehydrochlorination, chain scission, and crosslinking of macromolecules. Free HCl evolves and discoloration of the resin occurs along with important changes in physical and chemical properties. The evolution of HCl takes place by elimination from the polymer backbone; discoloration results from the formation of conjugated polyene sequences of 5 to 30 double bonds (primary reactions). Subsequent reactions of highly reactive conjugated polyenes crosslink or cleave the polymer chain, and form benzene and condensed and/or alkylated benzenes in trace amounts depending upon temperature and available oxygen (secondary reactions).

Stabilizer components have been used in PVC polymer compositions to reduce degradation of the polymer by neutralizing hydrochloric acid and accepting radicals generated by break down of the polymer chain. The chief purpose of a heat stabilizer is to prevent discoloration during processing of the resin compound. Degradation of the PVC polymer begins with the evolution of hydrogen chloride at about 200° F., increasing sharply with time and temperature. The most effective stabilizers have been found to be metal soaps, organo tin compounds, and epoxides.

Typically, stabilizers are provided in combination with a diluent. Typical diluents include short chain alcohols (having fewer than twelve carbon atoms, such as isodecyl alcohol), mineral spirits (this designation covers a variety of complex blends of differing solvating power, as known in the art), petroleum distillates, glycol ether, and the like. In some cases, the stabilizer is provided in a plasticizer as a diluent. Typical plasticizers include phthalates, epoxidized soybean oil, and other well-known plasticizers. The purpose of the diluent is generally to enhance solubility of the stabilizer in the PVC polymer and allow more rapid diffusion of the stabilizer in the polymer composition, as well as to enhance shelf stability of the stabilizer by reducing the incidence or amount of phase separation of the stabilizer component.

Despite inclusion of stabilizers and other additives to PVC, the polymer continues to emit VOCs post-processing, which in turn can lead to exposure to the VOCs for individuals who work or live in a building that contains PVC products. One the other hand, modification of the ingredients of the PVC to reduce emissions, for example in such PVC films as wallcoverings, can produce undesirable properties in the PVC product itself, such as reduced quality of the PVC film. As a result, despite efforts directed at VOC emissions, there is still room for improvement in reducing the amount of VOCs emitted from PVC products.

Efforts to detect VOC emissions from PVC products can focus on the identification and measurement of individual VOCs (IVOCs) and/or the total amount of VOCs (TVOCs) emitted from the product. Conventional PVC films have TVOC emission factors at 96 hours typically in the range of 4,500–5,000 $\mu g/m^2$/hour, as measured by such methods as a Volatile Ingredient Evaluation (described herein). Typical VOCs emitted by PVC films include phenol, 2-ethylhexanoic acid, 3-tridecene, 3,7-dimethyl 3-octanol, 3,7-dimethyl 1-octanol, 1-dodecene, polychlorinated biphenyls, sulfur dioxide, ozone, unsaturated alcohols, benzene, toluene and xylenes, chlorinated hydrocarbons, acetaldehyde, C9 and C10 aliphatic alcohols, and n-tetradecane, n-pentadecane.

Despite the awareness of problems associated with VOCs, efforts to reduce TVOC emissions from PVC products to suitably low levels can be improved.

SUMMARY OF THE INVENTION

Surprisingly, it has been found that a novel vinyl halide polymer composition can be formulated to reduce the amount of TVOC emitted from the polymer composition to below 1,000 $\mu g/m^2$/hour at the 96th hour after sample collection, as described herein. It has now been discovered that inclusion of a stabilizer component that includes a diluent comprising a monohydric alcohol having twelve or more carbon atoms greatly reduces VOC emissions from vinyl polymer materials, for example, films incorporating PVC polymers.

The vinyl halide polymer composition of the invention, and products incorporating these compositions, can provide one or more advantages, such as reduced emissions (including noxious fumes) both during processing of the vinyl halide polymer composition and after installation of the finished polymer product in a building, as well as improved print adhesion and long and short term print quality. The inventive composition can provide improved print registration and adhesion by improving surface tension of the composition. Further, the composition can provide a more acceptable environmental product, as a result of reduced TVOC emissions. The inventive composition can also provide vinyl halide polymer compositions that have reduced levels of free phenol, and extended shelf life. In this context, "shelf life" refers to the ability of polymer compositions according to the invention to maintain print fidelity over time, when the composition is to be printed some time after the polymer composition is fabricated (for example, weeks or months later).

In one aspect, the invention provides a film comprising chloride-containing vinyl polymer and a stabilizer component, wherein the film has a 96-hour Volatile Organic Compound Emission Factor of no more than 1,000 µg/m²/ hour. hi some preferred embodiments, the invention provides a film comprising chloride-containing vinyl polymer and a stabilizer component, wherein the film has a 96-hour Volatile Organic Compound Emission Factor of no more than 500 µg/ m²/hour.

In another aspect, the invention provides a film comprising vinyl chloride polymer and a stabilizer component comprising a stabilizer and a diluent, wherein the diluent comprises a monohydric alcohol having 12 or more carbon atoms.

In yet another aspect, the invention provides a method of stabilizing a chloride-containing vinyl polymer film comprising incorporating into the chloride-containing vinyl polymer a stabilizer component in an amount effective to stabilize the chloride-containing vinyl polymer, wherein the stabilizer component comprises a stabilizer and a diluent, wherein the diluent comprises a monohydric alcohol having 12 or more carbon atoms.

In another aspect, the invention provides a system for providing a low VOC releasing chloride containing vinyl polymer film, the system comprising a chloride-containing vinyl polymer film and a stabilizer component, the stabilizer component comprising a stabilizer and a diluent, wherein the diluent is a monohydric alcohol having twelve or more carbon atoms and a free phenol content of 3% by weight or less. In yet another aspect, the invention provides a method of printing a chloride-containing vinyl polymer film

DETAILED DESCRIPTION OF THE INVENTION

The invention provides a novel vinyl halide polymer composition that exhibits reduced VOC emissions. Surprisingly, it has been found that inclusion of a novel stabilizer component into vinyl halide polymer compositions significantly reduces TVOC emissions of the compositions. As discussed herein, 96-hour TVOC Emission Factors for conventional vinyl chloride polymer films (not in accordance with the invention) are as many as 100-times the levels seen when vinyl chloride polymer films are made according to the invention.

The invention thus provides novel vinyl halide polymer compositions, such as vinyl chloride polymer films, methods of stabilizing vinyl halide polymer compositions by including the stabilizer components described herein, as well as novel stabilizer components for vinyl halide polymer compositions. The invention also provides printable vinyl halide polymer compositions that exhibit improved surface characteristics, allowing enhanced print quality and clarity.

In one aspect, the invention comprises a novel vinyl halide polymer composition, such as a vinyl chloride polymer film. The vinyl halide polymer composition can be a suspension grade vinyl halide polymer over any molecular weight distribution. According to the invention, the vinyl halide polymer is an aqueous based polymer. Reference will be made to chloride-containing vinyl polymers as an exemplary embodiment of the invention; however, it is understood that other halogens may be used in the vinyl halide polymer composition according to the invention.

In one embodiment, the vinyl chloride polymer can be a homopolyvinyl chloride or a copolymer of a major amount by weight of vinyl chloride (for example, 80% by weight or more of vinyl chloride) and a minor amount by weight (for example, 20% by weight or less) of a copolymerizable monomer selected from the group vinyl acetate, vinylidene chloride and maleic ester. Bulk and solution vinyl chloride polymers can also be used. Resin material can be solvated in adequate solution form, for example, as a plastisol. Mixtures or reaction products of vinyl chloride polymers and/or other resins can be used. Vinyl chloride polymers and copolymers are well known.

According to the invention, the vinyl halide polymer composition includes a stabilizer component. Preferably, the stabilizer component includes a stabilizer and a diluent. In one preferred embodiment, the vinyl chloride polymer composition includes a stabilizer component in an amount effective to reduce degradation of the vinyl chloride polymer. Typically, degradation of the vinyl chloride polymer begins with the evolution of hydrogen chloride at processing temperatures of 200° F. or greater. Color changes parallel the amount of polymer composition degradation, running from white to yellow to brown to black. In the event the vinyl chloride polymer composition is tinted, color changes will parallel this progression, taking into account the starting, tinted, color.

The stabilizer component can be selected to provide one or more benefits to the vinyl chloride polymer composition, including reduction of discoloration, lubrication during processing, reduction of plate-out effects, compatibility with the resin systems, and resistance to sulfur staining as a result of atmospheric discoloration. The stabilizer component of the vinyl chloride polymer composition preferably includes one or more secondary stabilizers. Typically, secondary stabilizers are chosen to scavenge the hydrogen chloride generated by degradation of the vinyl chloride polymer composition. These stabilizers promote long-term stability of the vinyl chloride polymer composition.

Examples of suitable secondary stabilizers include alkyltin stabilizers, mixed metal stabilizers, alkyl phosphite stabilizers, β-diketones stabilizers, epoxidized fatty acid ester stabilizers, hydrotalcites stabilizers, and combinations of two or more of these. Further examples of secondary stabilizers include materials such as bis-phenylol propane, butylated hydroxytoluene, pentaerythritol, calcium, barium, and epoxy materials, and the like.

Examples of suitable alkyltin stabilizers include mono- and dimethyl-, butyl-, and octyltin thioglycolates, mercaptopropionates, and alkyl maleates. Examples of suitable mixed metal stabilizers include metal carboxylates, such as basic carboxylates derived from metals such as potassium, calcium or barium, which have little or no Lewis acidity and function primarily as hydrogen chloride scavengers.

Examples of suitable alkyl phosphite stabilizers include trialkyl phosphites. An example of a suitable epoxidized fatty acid esters includes epoxidized soybean oil. Examples of suitable hydrotalcite stabilizers include natural minerals, such as $Mg_6Al_2(OH)_{16}CO_{3-4}H_2O$.

Preferably, the stabilizer comprises an organophosphite stabilizer. One preferred organophosphite stabilizer comprises penta bis(2,4-dicumylphenyl pentaerythritol diphosphite), commercially available from Dover Chemical Corporation (Dover, Ohio) under the mark DOVER PhosBoosters™.

The stabilizer component is present in the vinyl chloride polymer composition in an amount effective to provide suitable stability to the polymer composition, by reducing degradation of the polymer composition, for example, a vinyl chloride polymer film. Preferably, the stabilizer component is present in an amount sufficient to provide a 96-hour Volatile Organic Compound Emission Factor of 1,000 µg/m²/hour or less, more preferably 500 µg/m²/hour or less. It will be apparent that the precise amount of stabilizer component used will be dependent upon several factors, including, but not limited to, the particular vinyl halide polymer employed, the temperature to which the polymer will be subjected, and the possible presence of other stabilizers. In general, the more severe the conditions to which the vinyl halide polymer is subjected, and the longer the term required for resisting degradation, the greater will be the amount of stabilizer component used.

In some embodiments, where the stabilizer component comprises an organophosphite stabilizer and a diluent, the stabilizer component is present in an amount of about 2 to about 5 parts-per-hundred parts resin on a weight basis (PHR). When the vinyl chloride polymer composition further comprises additional stabilizer compounds, for example, one or more primary stabilizers, one or more additional secondary stabilizers, or a mixture thereof, the total amount of stabilizer compounds in the film, from all sources, can range 2 to 12 PHR.

Typically, a PVC compounder (for example, a compounder of PVC films for the wallcovering industry), does not formulate its own stabilizer components. Rather, stabilizers are provided by suppliers who specialize in such components. In practice, the compounder will describe the PVC application and receive, for evaluation, a quantity of a stabilizer component. Typically, the compounder will identify the current stabilizer used, which may (or may not) be involved with certain compound attributes or properties that are less than totally satisfying. The stabilizer supplier then develops or selects a stabilizer component to meet these identified needs. The PVC compounder can then add the putative stabilizer component to its application on a laboratory scale and determine whether the putative component meets its requirements.

Generally, stabilizers for vinyl chloride polymer compositions can be provided in liquid or powder form. The supplier of the stabilizer will normally not disclose the intimate details of the stabilizer composition provided. The stabilizer composition provided can include one or more primary stabilizers, secondary stabilizers, lubricants, diluents, or combinations thereof. In some cases, the stabilizer can be identical to that provided by another specialty source, with the exception of the diluent used. Because the vinyl chloride polymer compounder does not typically know the intimate details of the stabilizer composition, the inclusion of VOCs in the stabilizer component is not known without running an analysis of the stabilizer component to determine VOC emissions.

In preferred embodiments of the present invention, the stabilizer component includes a diluent. Suitable diluents can be chosen to have low vapor pressure at ambient temperatures, but to become fugitive during most fabrication processes (for example, at processing temperatures of 150° C. or more), and to provide phase and viscosity stability to the stabilizer component. Further, suitable diluents can be chosen to provide desired viscosity for processability into the vinyl chloride polymer composition (for example, pumpability in the fabrication process, as well as dispensability in the vinyl chloride polymer composition). Suitable diluents include monohydric alcohols of various carbon content.

In one embodiment, the diluent comprises a monohydric alcohol having 12 or more carbon atoms. In some embodiments, the diluent comprises a monohydric alcohol having 14 to 16 carbon atoms. The diluent can include one type of monohydric alcohol or a combination of monohydric alcohols, as desired. Preferably, the diluent is present in an amount of 10–50% by weight of the stabilizer component, or 15–30% by weight of the stabilizer component. Generally, the diluent itself, as well as the stabilizer component as a whole (stabilizer plus diluent) will have a molecular weight that will allow the stabilizer component to be soluble in the PVC system to be used. Thus, the more carbon atoms included in the diluent, the more viscous the stabilizer component will become.

The fluid viscosity of the overall stabilizer component of the invention (that is, the stabilizer plus diluent) is in the range of 1,500 to 50,000 centipoise (cps). The particular fluid viscosity of the stabilizer component can affect processing conditions; that is, processing conditions can be modified to pump more viscous polymer compositions if the formulation of the polymer composition so requires.

In some preferred embodiments, the overall stabilizer component of the invention has a total free phenol content of 3% by weight or less. In some preferred embodiments, the stabilizer component has a total free phenol content of 2.5% by weight or less.

It has been surprisingly found that inclusion of the novel diluent as part of the stabilizer component in vinyl chloride polymer compositions significantly reduces TVOC emissions from these compositions. The inventive diluent, which comprises a monohydric alcohol having twelve or more carbon atoms, surprisingly affects the TVOC emissions from the vinyl chloride polymer composition as a whole. While not intending to be bound by a particular theory, it is believed that increasing the carbon content of the diluent reduces migration of components (for example, phenol, hexanoic acid, and other known VOCs) of the vinyl containing polymer composition, thereby reducing emissions of TVOCs from the overall polymer composition. By modifying the diluent of the stabilizer component according to the invention, TVOC emissions can be reduced by 100 times or more.

Other ingredients can be included to enhance the performance of the stabilizer component in the vinyl chloride polymer composition. Examples of such additional ingredients include compounds to enhance solubility of the stabilizer component or other additives. Solubilizing agents include stearates, laurates, pentaerythritol and the like.

The vinyl chloride polymer composition can include one or more primary stabilizers, in addition to the stabilizer component described herein. Generally, primary stabilizers are selected to react with allylic chlorides, so that the stabilizer is associated by complex formation with polymer chloride atoms. Thus, a primary stabilizer is a Lewis acid and provides short-term color stability to the vinyl chloride polymer composition. Examples of primary stabilizers include metals, which form metal chlorides, including zinc, cadmium, tin and lead. These metals are stronger Lewis acids and form covalent carboxylates, not only scavenge hydrogen chloride, but also substitute carboxylate for the allylic chlorine atoms.

The vinyl chloride polymer composition can also include plasticizer in amounts effective to make the polymer suitably flexible. Typical effects of plasticizers on vinyl chloride polymer film include increased flexibility, softness and elongation. Plasticizers can increase low temperature flexibility, improve roll release on calendars, reduce plate-out, and promote fusion. They can also reduce processing temperatures and melt viscosity in the case of calendering. The amount of plasticizer can be 30 to 100, or 30 to 50, or 34 to 45 parts-per-hundred parts resin.

Examples of suitable plasticizers include butyl octyl phthalate, dioctyl phthalate, hexyl decyl phthalate, dihexyl phthalate, diiusooctyl phthalate, dicapryl phthalate, di-n-hexyl azelate, diisononyl phthalate, dioctyl adipate, dioxtyl sebacate, trioctyl trimellitate, triisooctyl trimellitate, triisononyl trimellitate, isodecyl diphenyl phosphate, tricresyl phosphate, cresyl diphenyl phosphate, polymeric plasticizers, epoxidized soybean oil, octyl epoxy tallate, isooctyl epoxy tallate, and the like. Plasticizers are well known in the wallcovering industry. Mixtures of plasticizers can also be used in accordance with the invention.

Other vinyl chloride polymer compounding ingredients can be incorporated into the vinyl chloride polymer compositions of the invention. Examples of such ingredients include silicas such as precipitated silica, fumed colloidal silica, calcium silicate, and the like, calcium carbonate, ultraviolet light absorbers, antifungal agents, antimicrobial agents, carbon black, barites, dibasic lead phosphite, antimony ($Sb_2O_3$), zinc borate, blowing agents, antioxidants, densifying agents, and the like, as well as mixtures thereof. Coloring agents can be included, for example, $TiO_2$, red iron oxide, phthalocyanine blue, or green or other color pigments. Pigments and other dry additives are preferably dispersed or dissolved in one or more plasticizers before adding to the plasticized vinyl chloride polymer compositions. These compounding ingredients are used in effective amounts by weight to control such attributes of the vinyl chloride polymer as color, mildew, stabilization, and viscosity.

Optionally, the vinyl chloride polymer composition can include one or more fillers. When included, such fillers can provide such advantages as reduced production costs, opacity of the vinyl chloride polymer, resistance to blocking, reduced plate-out, improved dry blending. Fillers are known in the art, and any suitable filler can be included according to the invention. Examples of fillers include water ground calcium carbonate, silica, and talc.

Optionally, the vinyl chloride polymer composition can include lubricants, which can provide such benefits as improved internal flow characteristics of the polymer compound, reduced tendency for the compound to stick to the process machinery, improved surface smoothness of the finished product, and improved heat stability by lowering internal and/or external friction. Examples of lubricants include stearic acid, calcium stearate, zinc stearate, fatty acid esters and amides, distearyl phthalate, stearyl alcohol, Wax E, polyethylene AC 617, and the like.

The vinyl chloride polymer of the invention can optionally further include one or more blending or extender resins. Such blending or extender resins are included in a minor amount by weight as compared to the vinyl chloride polymer composition.

In some embodiments, the vinyl chloride polymer can contain one or more flame retardants, such as, for example, aluminum trihydrate, aluminum hydroxide, zinc stannate, antimony oxide, and the like.

Figure 1:
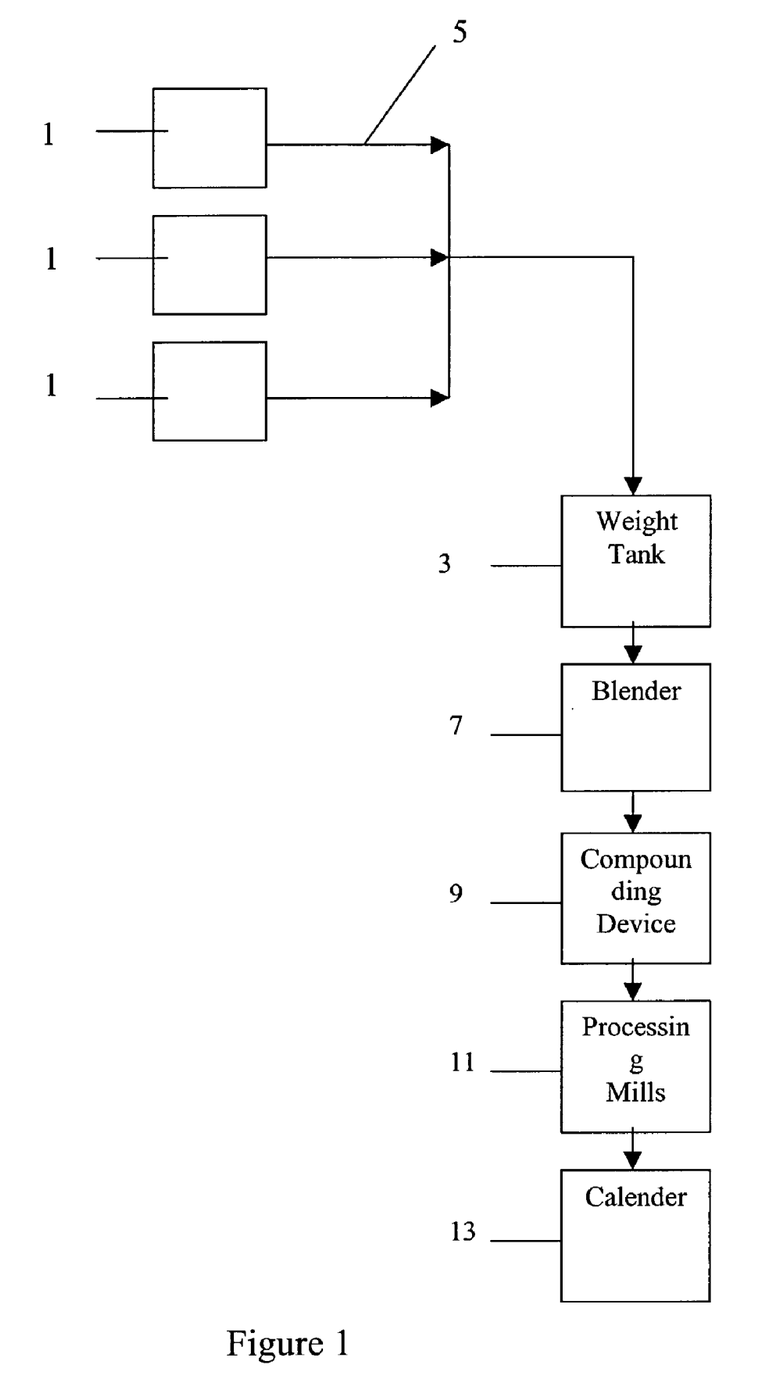
FIG. 1 shows a flow diagram of the processing of the vinyl halide polymer composition according to one embodiment of the invention.

FIG. 1 shows a flow diagram of the processing of the vinyl chloride polymer composition of the invention. This process will now be described in more detail.

Referring to FIG. 1, individual ingredients are introduced through inlets 1 into weight tank 3 via pipeline 5. The major raw materials are weighed in weight tank 3, and are then added to blender 7. Smaller amounts of materials, typically pigments and stabilizers, can be masterbatched (e.g., combined with some of the larger additives for greater accuracy) ahead of time so that they too can be weighed and added at this initial stage. The blender 7 mixes the dry and wet ingredients prior to mechanical and thermal processing of the material. Once the wet and dry ingredients have been sufficiently blended, they are passed to a compounding device 9.

The ingredients forming the chloride containing vinyl polymer can be charged to and mixed together in any one of several compounding devices, such as a Ross Planetary mixer, Hobart dough type mixer, Banbury, 2-roll rubber mill, Nauta mixer, ribbon blender, and so forth. In one embodiment, the compounding device 9 is a Banbury mixer, an internal mixer produced by Farrel Corporation, (headquarters located in Ansonia, Conn.). The Banbury mixer is used for mixing or compounding plastics and interspersing reinforcing fillers in a resin system. The mixer includes two contra-rotating spiral-shaped blades encased in segments of cylindrical housings, intersecting so as to leave a ridge between the blades. The blades can be cored for circulation of heating or cooling media. The Banbury thus produces a homogeneous mixture of the ingredients. Fed to batch or continuous machines, the blends are formed into homogeneous melt streams under high pressure to produce shear and temperatures around 150° C.

The melt streams are fed to an extruder to form strands, chunks, ribbons, or other acceptable forms. A mill or an extruder, in series with the Banbury mixer, partially degasses the melt and serves as a reservoir to help prevent running calender rolls together. At this stage of the process, the melt is maintained and delivered to the calender at approximately 140° C. to 160° C.

Once blended, the blend is then fed to processing mills 11. The mills 11 are utilized to further shear and mix the compound to bring it to a more uniform, homogeneous result. From the mill, the compound is transferred to a calender 13.

According to one embodiment of the invention, the calender comprises a four-roll, inverted L calender. Generally, the calender is a piece of equipment that controls the width and gauge of the vinyl film. The calender comprises a series of heated rolls. The bank is continuously formed into a rough sheet by the first nip (roll clearance). At the second nip, another lesser bank is formed and the sheet is thinned and widened. The sheet is taken off the last calender roll by a series of small stripper rolls, and then over and under a series of cooling rolls, before finally being wound on a tube or cut into sheets for shipment.

In calendering, PVC tends to follow the hotter and faster roll. Thus, the progression is to have each roll hotter and faster than the previous roll in the stack. Heated either by steam or hot oil, roll temperatures range from 150° C. to 200° C.

Material delivered to the first calender nip is regulated to form a 6-inch diameter rolling bank. The sheet passing the first nip forms another bank about 2 inches in diameter between the second and third rolls and so on until, at the firm nip, the desired thickness is obtained from the smallest bank possible to minimize the stress in the sheet.

Typically, thickness of the sheet coming from the last nip of the calender is intentionally oversized. This is to make up for as much as a ⅔ gage reduction that occurs when the sheet is stretched from 30 to 150% as it is stripped from the last calender roll by a series of two or more small stripping rolls. Design and operation of these stripping rolls affects shrinkage and flatness of the sheet.

Optionally, the chloride containing vinyl polymer film can be embossed, corona-treated, oriented, laminated, or otherwise primed. Embossing of thermoplastic films, layers or sheets is well known and is typically carried out by passing the film between an embossing roll and a backup roll under controlled preheating and post cooling conditions. In one embodiment, the surface of the chloride containing vinyl polymer film is embossed by passing the sheet coming from the stripper rolls between a textured steel roll nipped by a rubber roll that forces the chloride containing vinyl polymer film into the grain.

To laminate another sheet or fabric to the calendered sheet, the sheet can be nipped against the fabric on the last calender roll or a laminating station can be installed in place of or in addition to the embossing rolls.

The sheet is finally passed alternately over and under a series of cooling rolls to bring it to room temperature. The sheet is then trimmed to width and wound on a tube or cut to length and stacked as sheets. The wound or stacked sheets can then be stored for further processing, if desired.

The vinyl chloride polymer composition can be formed into layers or films that can be unsupported or supported. Where a vinyl chloride polymer plastisol composition is used, it can be cast on a release surface and heated to fuse it to form a film. Where a plasticized suspension grade vinyl chloride polymer composition is used, it can be calendered or extruded and fused to form a film. Temperatures can vary from about 200° to 400° F. In preferred embodiments, the compounded vinyl chloride polymer composition is supported or has a backing.

In embodiments where the vinyl chloride polymer composition is supported, the substrate can be a woven fabric (cotton, polyester, cotton blends, nylon, rayon, polyester fiberglass blends, polypropylene, polyethylene, and various blends thereof), a knit fabric, a non-woven fabric, paper, and the like. The fabric can be made of cotton, cellulose, nylon, polyester, aramid, rayon or acrylic fibers or cords or mixtures of the same. In some embodiments, the fabric can be treated with an adhesive coating to adhere or to improve adherence of the fabric with the vinyl chloride polymer composition. The temperature at which the vinyl chloride polymer is laminated is generally around 300° F.

Once the PVC film has been processed, it can be rolled onto itself into bolts of 20 yards, 40 yards, or any suitable amount of product. The bolts can then be packaged in any suitable packaging, such as, for example, plastic or paper wrapping material, for shipment to the consumer.

The surface of the chloride containing vinyl polymer film can be printed one or more times with a suitable receptive ink. Such inks are well known and can be applied by various methods of printing, such as gravure, flexography, screen printing, jet printing, web printing, and the like. In one embodiment, the polymer composition according to the invention can be printed with the ink described in copending application Ser. No. 10/262,545 ("Ink Formulations and Methods," Sobieski, filed 30 Sep. 2002, and commonly assigned to the assignee of the present application), the entire contents of which are expressly incorporated herein by reference.

The printing operation can be repeated for the desired number of applications to vary the colors or designs of the polymer composition at temperatures of about 150° F. to 165° F. for each printing step. In typical applications, the vinyl chloride polymer is printed 4–6 times by rotogravure printing. After printing, the polymer composition is dried at about 170° F. in a drying station.

Oftentimes, vinyl halide polymer compositions can be printed to provide a design on the surface of the polymer compositions. Examples of printed vinyl halide polymer compositions include wallcovering and decorative laminates that display a surface design. It has been surprisingly found that the vinyl halide polymer compositions of the invention exhibit improved print quality, including improved print clarity and definition, through increased wettability of the printing vehicle. Further, no prior surface treatment of the vinyl halide polymer composition is required to obtain the improved print quality (such as, for example, washing of the polymer composition with a solvent such as acetone or other cleaning agent to remove any surface migrants).

While not intending to be bound by a particular theory, it is believed that improved printing quality results, at least in part, from reducing the presence of migrants on the surface of the vinyl halide polymer composition. As used herein, "migrants" refers to components of the vinyl halide polymer composition that migrate within the polymer composition to the surface, where they can accumulate. Examples of migrants include VOCs (such as phenol, 2-ethylhexanoic acid, 3-tridecene, 3,7-dimethyl 3-octanol, 3,7-dimethyl 1-octanol, 1-dodecene, polychlorinated biphenyls, sulfur dioxide, ozone, unsaturated alcohols, benzene, toluene and xylenes, chlorinated hydrocarbons, acetaldehyde, C9 and C10 aliphatic alcohols, and n-tetradecane, n-pentadecane), solvents used in the polymer system, short chain or small molecules, and the like. The presence of such migrants on the surface of the film can affect printability of the film by increasing the surface tension of the vinyl halide polymer composition, thereby decreasing the difference in surface tension between the ink and polymer surface.

Surprisingly, it has been found that inclusion of the stabilizer component of the invention reduces the presence of migrants on the surface of the vinyl halide polymer composition.

On a microscopic level, the process of printing involves applying droplets of an ink solution onto the surface of a substrate (in the present case, the substrate comprises a vinyl halide polymer composition). When the droplets contact the substrate, they can either wet into the substrate or spread on the surface of the substrate. Spreading of the ink on the surface of the substrate (non-wetting) results in reduced print definition or clarity, which is undesirable.

Wetting or non-wetting of a solid by a liquid can be understood by studying contact angle. Contact angle methods have been developed extensively over the past several decades, and a large body of data has been accumulated correlating contact angle data with surface properties of tension. Contact angle describes the shape of a liquid drop resting on a solid surface. By drawing a tangent line from the drop shape to the touch of the solid surface, contact angle is defined as the angle between the tangent line and the solid surface. The measurement provides information to study the bonding energy of the solid surface and surface tension of the liquid droplet. Because of the simplicity in technique and measurement, it has been broadly accepted in various research environments and industries for material surface analysis related to wetting, adhesion and absorption. Thus, contact angle surface analysis can be done to determine qualities of the vinyl halide polymer surface, as well as quality of ink and coating wetting and spreading.

When a drop of liquid is resting on a solid surface, the drop of liquid forming an angle can be considered as resting in equilibrium by balancing the three forces involved, namely, the interfacial tensions between the solid and liquid (SL), that between solid and vapor (SV), and that between liquid and vapor (LV). The angle within the liquid phase is known as the contact angle or wetting angle. It is the angle included between the tangent plane to the surface of the liquid and the tangent plane to the surface of the solid, at any point along their line of contact. The surface tension of the solid will favor spreading of the liquid, but this is opposed by the solid-liquid interfacial tension and the vector of the surface tension of the liquid in the plane of the solid surface.

Thus, the critical surface tension of a solid surface is an important consideration when printing on the surface, and the critical surface tension values are intimately related to the surface constitution of the solid. Even small changes in the outermost atomic layer of the solid surface are reflected in a change of critical surface tension, while other properties of the solid might remain essentially unchanged. For example, a simple hydrocarbon surface, like that of polyethylene, exhibits contact angles leading to a critical surface tension of about 31 dynes/cm. Gradual replacement of hydrogen atoms in the surface by fluorine atoms gradually decreases the critical values to 19 dynes/cm as observed with polytetrafluoroethylene. Conversely, gradual replacement of surface hydrogen with chlorine atoms leads to an increased critical surface tension gradually approaching 41 dynes/cm as with polyvinylchlorides.

The presence of migrants on the surface of the polymer composition can thus affect the critical surface tension of the polymer composition, thereby affecting print quality. Generally speaking, the presence of migrants on the surface of the polymer composition will decrease the wettability of the surface of the polymer composition, thereby decreasing print quality.

Another factor considered when analyzing print quality is the surface tension of the solution to be applied to the solid substrate. For example, the surface tension of water at 20° C. is 72.8 dynes/cm. Thus, it would take a force of 72 dynes to break a surface film of water 1 cm long. The surface tension of water decreases significantly with temperature. Surface tension of water arises from the polar nature of the water molecule. Molecules in liquid state experience strong intermolecular attractive forces. When those forces are between like molecules, they are referred to as cohesive forces. When the attractive forces are between unlike molecules, they are said to be adhesive forces. The adhesive forces between water molecules and the surface of a polymer film, for example, lead to formation of a droplet of the water on the surface of the polymer. When, however, the difference between the surface tension of the droplet and the polymer substrate is sufficiently low, the droplet will wet into the surface of the substrate. Thus, the difference between the surface tension of an ink solution and the surface tension of the polymer composition can affect print quality of the polymer composition.

One common technique to determine surface energy of PVC films that is commonly practiced in the wallcovering industry is the use of dyne markers. According to this technique, dyne markers containing inks having a known surface energy are pulled across the surface of a film to be tested. Typically, a series of dyne markers will be used, for example, 30, 32, 34, 36, 38, and so on, dynes. One would begin with a dyne marker having a higher than anticipated surface energy, for example, 38. If the ink pulls back from the surface of the polymer, the ink is not wetting into the polymer. If the ink does not pull back from the surface, one would test the substrate surface with the next lowest dyne marker, for example, 36 in this scenario. The markers are used in series until the ink pulls away from the surface, indicating that the surface tension of the ink is too close to the surface tension of the polymer surface. Preferably, the surface tension of the ink is at least 10 dynes/cm less than the surface tension of the polymer substrate to achieve acceptable wetting of the substrate. This dyne marker technique can introduce inaccuracies, since the use of the dyne marker on the surface of the film can serve to wipe migrants out of the way, thereby exposing the "clean" surface of the vinyl halide polymer composition and affecting surface tension data.

An alternative, and preferred, method of determining surface tension of vinyl halide polymers is to measure the contact angle when a solution having a known surface tension is applied to the polymer surface. This analysis can provide a more accurate measurement of surface tension of the polymer composition.

According to this embodiment, water (or other suitable liquid) is applied to the surface of the film, and a Contact Angle System is used to measure Contact Angle of the droplet on the surface. Methods for measuring dynamic contact angles can use ASTM D5725-95 as a guide. According to these methods, the droplet of known liquid is applied with a timing accuracy of one millisecond. The droplet makes contact with the substrate at $t_0$ to which all subsequent timestamps are related. A liquid droplet of approximately 1–15 µl is pumped out at a dispensing tip. The droplet is lowered towards the substrate surface in synchronization with the video capture. The interaction between the liquid droplet and the specimen surface can be measured to provide wetting (contact angle), sorption (volume) and spreading (droplet base) measurements as a function of time. In some embodiments, the contact angle measuring system can be located within an environmental chamber, to maintain environmental conditions during analysis.

For example, an FTÅ200 Dynamic Contact Angle System (First Ten Ångstroms, Portsmouth, Va.) can be used to measure contact angle. The FTÅ200 includes a rapid video capture to analyze a drop of water or other liquid on a surface of a material. The drop is dispensed in the range of 1–15 µl, preferably 10 µl. FTÅ instruments measure the contact angle by imaging the drop on a CCD camera and analyzing the captured images on a personal computer. Because the test substrate is a vinyl polymer, the contact angle does not change over time.

According to this embodiment, a test sample of the vinyl halide polymer composition is introduced into the Contact Angle System. The test sample is a vinyl halide polymer film laminated onto a backing, with no printing or topcoat finishes to obscure the surface of the polymer film. A drop of liquid having a known surface tension (for example, water) is applied to the polymer surface, and dynamic contact angle measurements are made.

In one preferred embodiment of the invention, the difference in surface tension between the ink solution to be applied to the polymer composition and the surface of the polymer is ten (10) dynes/cm. Preferably, the surface energy of the ink solution is 10 dynes/cm or more lower than the surface energy of the polymer substrate to which it will be applied.

In a preferred embodiment of the invention, the surface tension of the PVC film is up to about 50 dynes/cm, or up to about 45 dynes/cm, or about 32–33 dynes/cm. By providing a difference in surface tension between the polymer composition and printing ink of 10 dynes/cm or more, printing quality can be improved. If the ink wets into the polymer surface, it will not spread and smear the print that was intended to be applied to the polymer surface. It will be appreciated that allowing flexibility in the surface tension of the vinyl halide polymer film according to the invention will provide more flexibility in the printing process as well. For example, typical water-based inks used in printing vinyl chloride polymer films have a surface tension of 30 to 35 dynes/cm. If the surface tension of the polymer is increased, printing inks of higher surface tension can also be used, since they will have a reduced chance of spreading on the surface of the vinyl halide polymer composition.

In the manufacture of printing inks, the contact angle formed by a drop of ink on the polymer composition determines the print quality of ink. PVC generally shows high contact angle behavior with many liquids. It has been observed that a lower contact angle is desirable, since as the contact angle decreases, this is indicative of a higher affinity of the ink to the substrate. However, if the contact angle becomes too low, this is indicative of a solution that will wet into the substrate and spread, thus exhibiting decreased print clarity.

The invention surprisingly provides improved print fidelity over time. In this context, the reduced amount of migrants on the surface of the polymer composition allows the user to fabricate the polymer composition at one point in time, and optionally apply print the polymer composition at a later point in time, for example, weeks or months after the polymer composition is fabricated. This extended shelf life provides more flexibility in printing, for example, wallcoverings or decorated laminates.

In some embodiments, the vinyl chloride polymer composition can further include a VOC containment coating, as described in U.S. application Ser. No. 10/262,544, ("VOC Containment Coating, Methods and Articles," filed 30 Sep. 2002, Sobieski, and commonly assigned to the assignee of the present application), the entire contents of which are expressly incorporated herein by reference.

Representative formulations for the vinyl chloride polymer composition are shown in the following Table 1.

TABLE 1

Representative formulations of vinyl chloride polymer composition.

| Reagent | A | B | C | D | E |
|---|---|---|---|---|---|
| PVC | 97 | 97.5 | 98 | 97.5 | 195 |
| Acrylic Resin | 3 | 2.5 | 2 | 2.5 | 5 |
| Calcium Carbonate | 33 | 44.5 | 40 | 47 | 47 |
| Aluminum Hydrate | 7 | 7 | 8 | 3 | 3 |
| Calcium stearate/Zinc stearate (dry powder blend) | 0.4 | 0.3 | 0.25 | 0.25 | 0.25 |
| Stearic Acid | 0.3 | 0.3 | 0.25 | 0.3 | 0.3 |
| Zinc Stearate | 0.2 | 0.2 | 0.2 | 0.2 | 0.3 |
| Diisononylphthalate | 34.5 | 34.5 | 44 | 40.5 | 40.5 |
| Anti-fungal, anti-microbial | 0.75 | 0.75 | 0.75 | 0.75 | 0.75 |
| Epoxidized soybean oil | 3 | 3 | 3 | 3 | 3 |
| Organic phosphite stabilizer, in diluent | 2.2 | 2.2 | 2.2 | 2.2 | 2.2 |
| Antimony oxide | 0 | 0 | 4 | 4 | 4 |

**Measurements given in PHR, parts-per-hundred parts resin by weight.

Volatile Ingredient Evaluations

Volatile Ingredient Evaluations are made by loading product to be tested into a controlled environmental chamber. The test sample is collected, placed in the environmental chamber, and air samples are collected over time to analyze VOC emissions.

Test sample is collected by cutting a portion from PVC film that is fabricated into a final product (for example, PVC film laminated to a backing for use as wallcovering). Care should be taken to collect the sample in a way that avoids emission of VOCs to a level that would alter test results. For example, if the PVC film is fabricated into final form and kept at ambient conditions without packaging or rolling the product onto itself, the PVC will begin emitting VOCs prior to the Volatile Ingredient Evaluation. This could alter the results of the evaluation, resulting in lower values than would be obtained if the sample was collected as described herein.

According to the Volatile Ingredient Evaluation, test sample can be collected as the PVC film leaves the cooling rolls as part of final processing, upon final inspection of the product (as it is cut into final form), or after the PVC film has been rolled onto itself into bolts. Each of these sampling techniques will be described. When the test sample is collected as the PVC film leaves the cooling rolls, a sample preferably measuring one square meter is cut from the film and placed in a suitable container, such as a plastic (for example, mylar) container until testing is to be performed. When the test sample is collected upon final inspection of the product, there can be a delay between the time the PVC film leaves the cooling rolls and actual inspection of the product, and the length of this delay can be dependent upon conditions in the manufacturing facilities. However, this delay should not affect the Volatile Organic Compound Emission Factors described herein. This delay can, in some cases, affect the decay curve of the polymer composition. Again, a sample measuring one square meter is cut from the film and placed in a suitable container until testing is to be performed.

When the test sample is collected after the PVC film is rolled onto itself into bolts, the amount of time that passes between fabrication of the product and harvesting of the test sample is not critical. When the PVC film is rolled onto itself into bolts, the VOCs in the chloride-containing vinyl polymer film are retained within the film. Therefore a sample that has been rolled onto itself can be evaluated six months, a year, or even several years after manufacture. The act of rolling the sample onto itself prevents VOCs from emitting from the surface of the PVC film, and therefore, so long as the product is rolled, the amount of time that passes between fabrication of the product and measurement of VOC emissions is not critical. When the PVC film is rolled onto itself in bolts, the bolts can be wrapped in any suitable material, such as paper or plastic, for storage purposes. However, such exterior wrapping of the bolts is not necessary to prevent emissions of VOCs from the PVC film, for the reasons discussed herein. When the test sample is collected from a bolt of film, the sample is harvested three yards into the bolt, to avoid obtaining a sample that is exposed to air.

In one preferred sampling scenario, test sample is collected by obtaining a 40-yard bolt of PVC film from the shelf. A square meter of the PVC film is cut from a position three yards into the bolt. The test sample is stored in a container, such as a plastic bag, until it is tested.

Samples are tested in environmental chambers designed to measure emissions from the sample. The size of the environmental chamber is chosen to allow testing at the same loading ratio of exposed surface area to room volume as found in a typical indoor environment, so that the results of the chamber testing are scalable to any size room. Typically, the environmental chambers are provided in a size in the range of approximately 0.5 $m^3$ to approximately 26 $m^3$ (which would simulate room size). When the test samples are provided as one square meter (1 $m^2$) of vinyl halide polymer film, the test chamber is preferably one cubic meter (1 $m^3$) in size. Test chambers are manufactured by Air Quality Sciences, Inc. (Atlanta, Ga.).

Likewise, the interior of the environmental chamber is designed to provide an inert environment so that background emissions levels are kept as low as possible. The walls and doors of the environmental chamber are constructed of polished stainless steel with inert seals. The test chamber is designed to meet construction specifications and performance requirements established by the U.S. EPA guidelines and ASTM Standard D5116-97, "Standard Guide for Small Scale Chamber Determination of Organic Emissions from Indoor Materials/Products," and ASTM Standard D 6670-01, "Standard Practice for Full-Scale Chamber Determination of VOCs from Indoor Materials/Products." Prior to loading sample into the environmental chamber, background levels can be determined to establish a baseline for testing.

Optionally, sample can be permitted to equilibrate with the environmental conditions in the chamber prior to commencement of the testing period. When performed, this equilibration period generally comprises four to twenty-four hours. In a preferred scenario, an equilibration period is not included in the testing protocol.

During testing, purified air at standard environmental conditions of 23° C. (73.4° F.) and 50% relative humidity is cycled through the environmental test chamber, and these standard conditions are maintained throughout the testing period. The environmental chamber includes inlet air and exhaust air manifold systems that are configured to assure that the air inside the chamber is well mixed, so that an air sample from the center of the chamber contains the same concentration of pollutants (from a product inside the chamber) as an air sample from one of the back corners of the chamber. Environmental conditions of the inlet air and the chamber air can be monitored throughout the test to assure that the test conditions are met and the chamber operates in a stable manner.

Sampled air from the environmental chamber is collected on a solid sorbent and thermally desorbed into a gas chromatograph with mass spectrometric detection (GC/MS). The solid sorbent collection media contains both Carbosieve SIII and Tenax TA. The following instrumentation is used to analyze results: NuTech 8533 Universal Sample Concentrator with a HP 5890 Series II Gas Chromatograph and HP 5971 Series Mass Selective Detector (MSD) or a Perkin-Elmer ATD-400 Thermal Desorbtion System with a HP 6890 GC and HP 5973 MSD.

After collection, the chemicals adsorbed on the sorbent media are thermally desorbed into the capillary GC/MS. Individual VOCs are separated and detected by the GC/MS. Individual VOCs can be quantified (relative to a suitable standard such as phenol, hexanoic acid, 1-dodecene, toluene, or other VOCs suspected to be emitted from the product) and identified by comparison to known mass spectral data. Mass spectral databases are maintained by Air Quality Sciences, Inc. (AQS, Atlanta, Ga.) and by the Environmental Protection Agency and National Institutes of Health. TVOC measurements are made by adding all individual VOC responses obtained by the mass spectrometer and calibrating the total mass relative to toluene.

The multi-bed collection technique, separation, and detection analysis methodology are described, for example, in Bertoni, G., Bruner, F., Liberti, A. and Perrino, C. "Some Critical Parameters in Collection, Recover, and Gas Chromatographic Analysis of Organic Pollutants in Ambient Air Using Light Adsorbents." J. Chromatogr., 203, 263–270 (1981); Bertoni, G., Bruner, F. and Crescentini, G. "Critical Evaluation of Sampling and Gas Chromatographic Analysis of Halocarbons and other Organic Air Pollutants." J. Chromatogr., 167, 399–407 (1978); Mangani, F., Marras, O. and Mastrogiacomo, A. "Evaluation of the Working Conditions of Light Adsorbents and their Use as Sampling Material for the GC Analysis of Organic Air Pollutants in Work Areas." Chromatographia, 15, 712–716 (1982); Murphy, N. T., Riggan, R. M. and Winberry, W. T. Environmental Protection Agency. *Compendium of Methods for the Determination of Toxic Organic Compounds in Ambient Air* (EPA Rpt, 600/4-89/017). Washington, D.C.: Environmental Protection Agency (1988), (the disclosures of which are incorporated herein by reference).

The Volatile Ingredient Evaluation follows EPA Method 1P-1B and is generally applicable to $C_4$–$C_{16}$ organic chemicals with boiling points ranging from 35° C. to 250° C. The evaluation has a detection limit of 0.5 µg/$m^3$ for most IVOCs and TVOCs.

VOC emissions are measured over a testing period, typically over 96 hours. The Volatile Ingredient Evaluation provides three measurements: emission factors, emission rates, and predicted air concentrations. A Volatile Organic Compound Emission Factor is the amount of a chemical that is emitted at a particular point in time. The Emission Factor is measured for a certain exposed area of the product, for example, a square meter of the chloride-containing vinyl polymer film. For example, a chloride-containing vinyl polymer film can emit 50 µg/$m^2$/hr of phenol. This means that every square meter of the vinyl chloride polymer film will emit 50 micrograms of phenol per hour of exposure time. This assumes the product is constantly emitting phenol. If the product is not constantly emitting phenol, but emissions are decreasing over time, the Emission Factor is a qualitative estimate of emissions release at a particular point in time.

Surprisingly, the vinyl chloride polymer film of the invention has a 96-hour Volatile Organic Compound Emission Factor of no more than 1,000 µg/$m^2$/hour. Preferably, the vinyl chloride polymer film has a 96-hour Volatile Organic Compound Emission Factor of no more than 750 µg/$m^2$/hour. In some preferred embodiments, the vinyl chloride polymer film according to the invention has a 96-hour Volatile Organic Compound Emission Factor of no more than 500 µg/$m^2$/hour. This Emission Factor is significantly lower than conventional vinyl chloride polymer films, as illustrated in the Examples.

An emission rate mathematically describes how a product's emissions change over time. This emission rate requires an environmental chamber test with multiple sampling episodes, over an extended time period (typically, six samples over the 96-hour test period). Several factors can affect the emission rate of a product, including temperature, humidity, air exchange rate, ambient pollutant concentrations, and air velocity. For most interior products, emission rates are either constant (product emissions remain the same over a test period) or they are decreasing (product emissions actually decline over a test period). The emission rate is commonly displayed as a mathematical equation using two characteristic parameters: the initial emission factor and the decay rate. These two parameters define the emission rate profile. The test period is 96 hours with periodic measurement points, for example, at 4, 8, 24, 48, 72 and 96 hours. The Emission Factor describes a product's emissions at one point in time assuming constant emissions. If a product has been shown to be a constant emitter, the Emission Factor and emission rate will be the same. If the product's emissions change over time, it will have a different Emission Factor at every point in time.

The predicted air concentration describes the amount of chemicals or particles contained in a unitized volume of air. When the air in a dynamic chamber is sampled, the mass collected is what is actually measured. The air concentration (expressed in $\mu g/m^3$) is then derived as the collected mass of the contaminant (in micrograms) divided by the amount of air sampled (cubic meters). The measured air concentration is representative of what a building's occupants would breathe.

To determine a product's predicted air concentration, the product's emission rate must be determined, since the more a product emits pollutants, the greater the exposure concentration of pollutants in a room. The environment in which the product will be used must then be defined. The use environment is described in terms of building air flows, percentage of outside air, room size, amount of product in the space, and possible additional emission sources. These parameters are used in a computer program that mathematically models the actual air flow and emissions and calculates the predicted air concentration.

TVOC standards for air concentrations for wallcoverings have been developed by the State of Washington (0.5 mg/m$^3$ at ambient conditions, including 23° C., 50% relative humidity) and the U.S. Environmental Protection Agency (0.05 mg/m$^3$, at ambient temperatures, including 23° C., 50% relative humidity).

The principles of the invention will now be described in the following illustrative examples.

EXAMPLE 1

Wallcovering samples were fabricated of PVC laminated to a fabric backing, and TVOC Emission Factors were measured for the wallcovering as follows. Polyvinyl chloride containing stabilizer, plasticizer, and other compounding agents was processed according to the following formulations:

Composition A:

| Reagent | PHR |
|---|---|
| PVC | 97.5 |
| Acrylic Resin | 2.5 |
| Calcium Carbonate | 47 |
| Aluminum Hydrate | 3 |
| Barium stearate/Zinc stearate (dry powder blend) | 0.25 |
| Stearic Acid | 0.3 |
| Diisononylphthalate | 40.5 |
| Anti-fungal, anti-microbial | 0.75 |
| Epoxidized soybean oil | 3 |
| Zinc carboxylate/barium carboxylate/organophosphite liquid stabilizer blend | 2.2 |
| Antimony oxide | 4 |

Composition B:

| Reagent | PHR |
|---|---|
| PVC | 97.5 |
| Acrylic Resin | 2.5 |
| Calcium Carbonate | 47 |
| Aluminum Hydrate | 3 |
| Calcium stearate/Zinc stearate (dry powder blend) | 0.25 |
| Stearic Acid | 0.3 |
| Zinc Stearate | 0.2 |
| Diisononylphthalate | 40.5 |
| Anti-fungal, anti-microbial | 0.75 |
| Epoxidized soybean oil | 3 |
| Organic phosphite stabilizer, diluent* | 2.2 |
| Antimony oxide | 4 |

*The diluent included in the stabilizer component of Composition B (organic phosphite plus diluent) included a mixture of alcohols, wherein each of the alcohols had twelve or more carbon atoms.

Composition B thus contained a stabilizer component according to one embodiment of the invention; that is, a stabilizer plus diluent. Composition A, on the other hand, lacked the inventive stabilizer component. Once fabricated, the PVC film of Compositions A and B were each laminated onto a 100% polyester woven fabric backing (having a thickness of 4 mils before lamination to the film) at about 300° F. to form a plasticized and compounded PVC film about 10 mils thick after lamination. Next the PVC film was printed three times with heating at about 170° F. between each printing step to form a design on the surface of the PVC film. The printed film was then passed under an embossing roll and cooled to form an embossed pattern on the printed PVC film.

Test samples measuring a square meter were cut from the laminated PVC film immediately after the film left the cooling rolls, and placed in a sealed container until introduced into an environmental test chamber for Volatile Ingredient Evaluation. From the container, test sample was laminated to a stainless steel plate with sodium silicate so that the surface of the film was the only emitting source. The sample was then placed in an environmental chamber measuring one cubic meter, and the chamber was sealed. Once the environmental chamber was sealed, purified air at 23° C. and 50% relative humidity was supplied to the chamber and air flow was maintained through the chamber during the testing period. At the beginning of the fourth hour of testing, air was bypassed through a solid sorbent containing Carbosieve SIII and Tenax TA for one hour. This bypass of sampled air was performed on the 4$^{th}$, 8$^{th}$, 12$^{th}$, 24$^{th}$, 48$^{th}$, and 96$^{th}$ hour. The collected air samples were then desorbed into a gas chromatograph with mass spectrometric detection (GC/MS) and analyzed using a NuTech 8533 Universal Sample Concentrator with a HP 5890 Series II Gas Chromatograph and HP 5971 Series Mass Selective Detector (MSD) or a Perkin-Elmer ATD-400 Thermal Desorbtion System with a HP 6890 GC and HP 5973 MSD.

Figure 2:
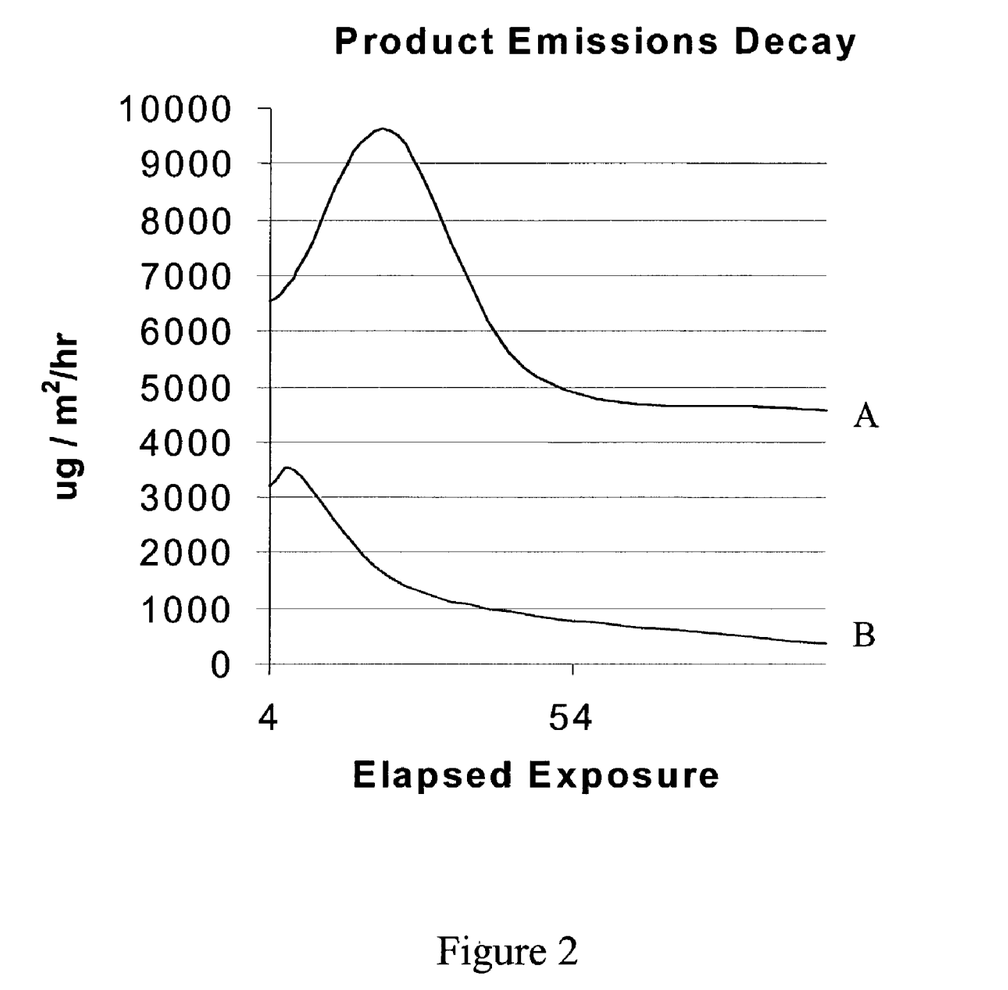
FIG. 2 shows product emissions decay for a composition according to one embodiment of the invention, compared to a composition that does not include the stabilizer component of the invention.

The TVOC Emission Factors were determined and are shown in FIG. 2. As shown in FIG. 2, Composition A displayed an Emission Factor at 4 hours of approximately 6,500 μg/m²/hr, peaked at approximately 9,600 μg/m²/hr, and displayed an Emission Factor of approximately 4,800 at 54 hours exposure. TVOC at the 96$^{th}$ hour of testing for Composition A was 4,951 μg/m²/hr.

In contrast, Composition B displayed an Emission Factor at 4 hours of approximately 3,200 μg/m²/hr, peaked at approximately 3,500 μg/m²/hr, and displayed an Emission Factor of approximately 900 μg/m²/hr at 54 hours. TVOC at the 96$^{th}$ hour of testing for Composition B was 274 g/m²/hr. As shown, Composition B, produced in accordance with one embodiment of the present invention, showed a 96-hour TVOC Emission Factor that was significantly lower than 96-hour TVOC Emission Factor of a composition not in accordance with the invention.

EXAMPLE 2

PVC samples were prepared using the formulations from Example 1 above, with the following additions. For each of Compositions A and B, titanium dioxide (TiO$_2$) was added in an amount of less than 5 PHR, and Composition A was pigmented (beige) as known in the art. The PVC films were laminated to a 100% polyester woven backing having a thickness of 4–20 mils (prior to being laminated to the PVC film) and were removed from the calendering process without printing or topcoating the polymer substrate.

Contact angle information was obtained as follows. Three samples each of Composition A and Composition B were obtained, and three sections were tested for each sample (a side section, middle section, and side section). Samples were introduced to a FTÅ200 DCA Machine (First Ten Ångstroms, Portsmouth, Va.). The contact angle system applied a 10 μl droplet of water to each sample, and dynamic contact angle measurements were taken. Results are shown in Table 2 below:

TABLE 2

Contact angle measurements (Water)

| Sample | Side Section | Middle Section | Side Section |
|---|---|---|---|
| Composition A | | | |
| 1A | 99.18° | 102.77° | 96.43° |
| 2A | 97.36° | 103.17° | 95.80° |
| 3A | 97.67° | 104.33° | 101.81° |
| Average | 98.07° | 103.42° | 98.01° |
| Standard Deviation | ±0.9737° | ±0.8103° | ±3.303° |
| Composition B | | | |
| 1B | 87.72° | 93.24° | 88.04° |
| 2B | 87.77° | 94.09° | 87.62° |
| 3B | 88.09° | 95.47° | 86.49° |
| Average | 87.86° | 94.27° | 87.38° |
| Standard Deviation | ±0.2007° | ±1.125° | ±0.8016° |

As shown in the Table 2, the contact angle measurements performed on Composition B decreased by 10°, which shows that Composition B displayed a higher degree of compatibility in wetting with the water. In other words, Composition B, which included the inventive stabilizer component, showed improved wettability, and thus improved print quality.

Next, contact angle data was obtained using a 32 dynes/cm solution, which approximates the surface tension of a typical ink solution using in printing wallcoverings or decorative laminates. One section from Composition A and Composition B were run, and three contact angle measurements were taken for each sample. Samples were introduced to a FTÅ200 DCA Machine (First Ten Ångstroms, Portsmouth, Va.). The contact angle system applied a 10 μl droplet of the 32 dynes/cm solution to each sample, and dynamic contact angle measurements were taken. Results are shown in Table 3 below:

TABLE 3

Contact angle measurements (32 dynes/cm Solution)

| Runs | Section |
|---|---|
| Composition A | |
| 1 | 33.79° |
| 2 | 31.67° |
| 3 | 31.80° |
| Average | 31.75° |
| Standard deviation | ±0.07234° |
| Composition B | |
| 1 | 17.68° |
| 2 | 18.21° |
| 3 | 20.26° |
| Average | 18.72° |
| Standard deviation | ±1.363° |

As shown in the Table 3, the contact angle measurements performed on Composition B decreased by approximately 13°, again showing the increased wettability of Composition B by the 32 dynes/cm solution. Again, Composition B, which included the inventive stabilizer component, showed improved wettability, and thus improved print quality.

The invention claimed is:

1. A flexible polyvinyl chloride film comprising:
    a. chloride-containing vinyl polymer;
    b. plasticizer in an amount in the range of 30 to 100 parts-per-hundred parts resin;
    c. a stabilizer component comprising a stabilizer and a diluent, wherein the diluent comprises a monohyciric alcohol having 12 or more carbon atoms that is present in an amount in the range of 10–50% by weight of the stabilizer component, and wherein the stabilizer and diluent are each selected such that, when the stabilizer component is combined with the chloride-containing vinyl polymer to form a flint, the film has a 96-hour Volatile Organic Compound Emission Factor of no more than 1,000 μg/m²/hour and
    d. a backing attached to the film.

2. The film according to claim 1 wherein the film has a 96-hour Volatile Organic Compound Emission Factor of no more than 500 μg/m²/hour.

3. The film according to claim 1 wherein the stabilizer is an organophosphite.

4. The film according to claim 1 further comprising one or more primary stabilizers.

5. The film according to claim 4 wherein the one or more primary stabilizers is selected from the group consisting of metal carboxylates, metal stearates, and combinations thereof.

6. A method of stabilizing a flexible chloride-containing vinyl polymer film comprising steps of:
   a. providing a chloride-containing vinyl polymer including plasticizer, the plasticizer being present in an amount in the range of 30 to 100 parts-per-hundred parts resin, and
   b. incorporating into the chloride-containing vinyl polymer a stabilizer component in an amount effective to stabilize the chloride-containing vinyl polymer, wherein the stabilizer component comprises a stabilizer and a diluent, wherein the diluent comprises a monohydric alcohol having 12 or more carbon atoms, and wherein the stabilizer and diluent are each selected such that, when the stabilizer component is combined with a vinyl chloride polymer to form a film, the vinyl chloride polymer film exhibits a 96-hour Volatile Organic Compound Emission Factor of 1,000 µg/m²/hour or less;
   c. forming the chloride-containing vinyl polymer with stabilizer component into a flexible film; and
   d. attaching a backing to the film.

7. The method according to claim 6 wherein the stabilizer component has a free phenol content of 3% by weight or less.

8. The method according to claim 6 wherein the stabilizer component has a fluid viscosity of 1,500 to 50,000 centipoise.

9. The film according to claim 1 wherein the film is a wallcovering or a decorative laminate, and wherein the backing is selected from woven fabric, knit fabric, non-woven fabric, or paper.

10. The film according to claim 1 wherein the film is printed, and the film has a surface tension up to 50 dynes/cm.

11. The film according to claim 1 wherein the film has a reduced contact angle relative to a polyvinyl chloride film that lacks the stabilizer component.

12. The method according to claim 6 wherein the step of attaching a backing to the film comprises attaching a backing selected from woven fabric, knit fabric, non-woven fabric, or paper to form a wallcovering or a decorative laminate.

13. The method according to claim 6 further comprising a step of printing the film, the film having a surface tension up to 50 dynes/cm.

14. The film according to claim 1 wherein the plasticizer is selected from the group consisting of butyl octyl phthalate, dioctyl phthalate, hexyl decyl phthalate, dihexyl phthalate, diisooctyl phthalate, dicapryl phthalate, di-n-hexyl azelate, diisononyl phthalate, dioctyl adipate, dioxtyl sebacate, trioctyl trimellitate, triisooctyl trimellitate, triisononyl trimellitate, isodecyl diphenyl phosphate, tricresyl phosphate, cresyl diphenyl phosphate, polymeric plasticizers, epoxidized soybean oil, octyl epoxy tallate, isooctyl epoxy tallate, and combinations of any one or more of these.

15. The method according to claim 6 wherein the step of providing a vinyl chloride polymer including plasticizer comprises providing vinyl chloride polymer including plasticizer selected from the group consisting of butyl octyl phthalate, dioctyl phthalate, hexyl decyl phthalate, dihexyl phthalate, diisooctyl phthalate, dicapryl phthalate, di-n-hexyl azelate, diisononyl phthalate, dioctyl adipate, dioxtyl sebacate, trioctyl trimellitate, triisooctyl trimellitate, triisononyl trimellitate, isodecyl diphenyl phosphate, tricresyl phosphate, cresyl diphenyl phosphate, polymeric plasticizers, epoxidized soybean oil, octyl epoxy tallate, isooctyl epoxy tallate, and combinations of any one or more of these.

* * * * *